US006932734B2

(12) United States Patent
Hwa et al.

(10) Patent No.: US 6,932,734 B2
(45) Date of Patent: Aug. 23, 2005

(54) PLANETARY GEAR APPARATUS (75) Inventors: Su-Yang Hwa, Taipei (TW); Richard Charles Appleyard, Bilgola Plateau (AU); Tao-Yun Lo, Taipei (TW)

(73) Assignee: Austai Motors Designing Pty. Ltd., Bilgola Plateau (AU)

( * ) Notice: Subject to any disclaimer, the term of this patent is extended or adjusted under 35 U.S.C. 154(b) by 0 days.

(21) Appl. No.: 10/398,231

(22) PCT Filed: Sep. 20, 2001

(86) PCT No.: PCT/AU01/01182

§ 371 (c)(1),
(2), (4) Date: Aug. 25, 2003

(87) PCT Pub. No.: WO02/29286

PCT Pub. Date: Apr. 11, 2002

(65) Prior Publication Data

US 2004/0018909 A1 Jan. 29, 2004

(30) Foreign Application Priority Data

Oct. 4, 2000 (AU) .............................................. PR0540

(51) Int. Cl.$^7$ .............................................. F16H 48/06
(52) U.S. Cl. ...................................... 475/221; 475/225
(58) Field of Search ................................ 475/221, 231, 475/225

(56) References Cited

U.S. PATENT DOCUMENTS

| 4,434,680 | A | * | 3/1984 | Riediger et al. ............... 475/23 |
| 4,677,873 | A | * | 7/1987 | Eastman et al. ............. 475/204 |
| 5,030,185 | A | * | 7/1991 | Kawamura .................... 475/227 |
| 5,108,352 | A | * | 4/1992 | Pires ............................ 475/170 |
| 5,135,071 | A | * | 8/1992 | Shibahata et al. ........... 180/249 |
| 5,466,197 | A | * | 11/1995 | Mitsuya et al. ................ 475/72 |
| 5,662,009 | A | * | 9/1997 | Palmer ....................... 74/810.1 |
| 6,478,706 | B1 | * | 11/2002 | Crabb .......................... 475/18 |
| 6,752,733 | B2 | * | 6/2004 | Rogers et al. .................. 475/9 |

* cited by examiner

Primary Examiner—Tisha Lewis
(74) Attorney, Agent, or Firm—Rosenberg, Klein & Lee (57) ABSTRACT A planetary gear apparatus that includes a pair of internal ring gears (24a, 24b) interconnected to be driven together, a pair of planetary gear assemblies (25a, 25b) each associated with a respective internal ring gear (24a, 24b), and each comprising plural pairs of planet gears (48, 49), where each pair of planet gears (48, 49) has an outer planet gear (48) in mesh with the respective internal ring gear (24a or 24b) and with its inner planet gear (49); and a pair of sun gears (27a, 27b) each associated with a respective planetary gear assembly (25a, 25b). The planetary gear apparatus of the invention can be incorporated into the transfer case or differential housing of a four-wheel-drive vehicle so that the dual internal ring gears (24a, 24b) and central pinion shafts (35a, 35b) become the main distributors of driving torque, delivering equal full-time traction and possessing the capacity of differentiating rotational speed between the front and rear driveshafts and between the opposite wheels of the vehicle in straight driving or during cornering. More importantly, even when one wheel or one axle of the driven four-wheel-drive vehicle has lost traction, or suspended above the ground, all the driving torque will the distributed to the axle(s) and related wheel(s) that are still in contact.

16 Claims, 9 Drawing Sheets

PLANETARY GEAR APPARATUS

FIELD OF THE INVENTION

This invention relates to a planetary gear apparatus comprising a symmetric arrangement of dual planetary assemblies externally meshed with dual internal ring gears and internally meshed with dual sun gears.

The purpose of such an invention is to provide four wheel-drive vehicles with equal full-time traction and differentiation of rotational speed between front and rear driveshafts, and two and four wheel drive vehicles with equal full-time traction and differentiation of rotational speed between opposite wheels in response to any road or driving condition.

DESCRIPTION OF PRIOR ART

For the conventional planetary gear apparatus, the apparatus is mainly constructed of one mounted internal ring gear, one sun gear and one planetary gear assembly comprising a plurality of sets of paired outer and inner planet gears (U.S. Pat. No. 5,282,775). All planet gears are rotatably supported and held together by a pair of planet gear carriers with respect to the planetary gear apparatus case. The outer planet gears are externally meshed with the internal ring gear and the inner planet gears are internally meshed with the sun gear in a concentric relation. One planet-gear carrier having a large central bore is concentrically coupled with sun gear, which is splined with the half axle of the wheel, while the opposite planet-gear carrier having a centrally extended hub is directly coupled to the opposite half axle.

As understood, this single planetary gear assembly transmits driving torque via a single internal ring gear, a single sun gear, a plurality of planet gears and a pair of planet-gear carriers instead of using pinion gears and shafts, and two sun gears as used in a conventional open planetary gear apparatus.

When the above planetary gear assembly is operating, the driving torque from engine is transmitted to rotate the planetary gear apparatus and internal ring gear. Synchronously, the driving torque is distributed through outer planet gears which interacts with the inner planet gears to rotate the sun gear and inboard splined half axle, while the opposite planet-gear carrier is powered to directly rotate the other half axle through its extended hub. During straight driving, or smooth ground conditions, all components in such a kind of planetary-gear type assembly are rotated as an integral unit to deliver equal torque to all wheels. However, when the vehicle is cornering in one direction, the outside wheel needs to travel a greater distance along a larger outer arc. The increased ground reaction force exerted on the outside wheel will power the sun gear to rotate faster than the planetary gear apparatus case and actuate the inner planet gears. Simultaneously, through the interaction between inner planet gears and outer planet gears, the planetary gear assembly is independently rotated in a reverse direction around the internal ring gear. As such the rotation speed of the inside planet-gear carrier coupled to the inside half axle is reduced allowing a smooth turn to be achieved just as the traditional open planetary gear apparatus does.

When the vehicle is cornering in the opposite direction, the ground reaction force on the outside wheel will power the outside planet-gear carrier to rotate faster than the differential case. Simultaneously through the interaction between inner and outer planet gears, and the internal ring and sun gear, the planetary gear assembly is independently rotated in a forward direction around internal ring gear, Thereby the rotation speed of the opposite sun gear coupled to the inside half axle is reduced with respect to the planetary gear apparatus case to allow a smooth turn to be achieved.

Unfortunately, the undesirable bias of driving torque from the wheel having maximal frictional force to the wheel having the least frictional force is a major drawback of a single planetary gear apparatus. In adverse ground condition, the vehicle can lose substantial traction due to transfer of torque from the wheel that is in contact with the ground to the wheel that is slipping or suspended. This could result in the vehicle becoming stuck or stranded.

In order to divert driving torque from the suspended wheel to the grounded wheel, some rotation-limiting devices have been introduced to reduce the interactive rotation between the components within the planetary differential. Commonly, a cluster of clutches, actuated by a pre-loaded spring or the like, is utilized to limit the relative rotation within the mechanism (U.S. Pat. No. 4,041,804, U.S. Pat. No. 5,176,590, U.S. Pat. No. 5,326,333). However the inevitable production of heat and wear caused by partial loss of traction are undesirable problems which increase friction and wear amongst the components of the planetary gear apparatus. To avoid these drawbacks regarding friction, the surface geometry between the relatively rotating components, such as planet gears and associated rotational axes are engineered to increase the relative contact surfaces (U.S. Pat. No. 5,209,707). To prevent heat and wear, some helical grooves on the surface of rotating components are implemented to increase lubrication. However, no matter what kind of the improvement is made to the original design, these modified planetary gear apparatuses still share the same undesirable characteristics that are inherent of all limited-slip type differentials including heat, wear and tear between the planetary components and partial loss of traction.

In terms of the transfer unit, the transfer case is the heart of a four-wheel-drive vehicle, and is designed to distribute driving torque from the transmission to the front and rear driveshafts. In gear-driven or belt-driven type transfer cases, single or dual planetary-gear apparatus assemblies are quite commonly utilised to bias driving torque to the front and rear driveshaft in response to road conditions just as a conventional open planetary gear apparatus transfer case does. Unfortunately, the indigenous drawback of delivering driving torque to the driveshaft of the wheels with the least friction force, as is the case with the conventional pinion gear-type or planetary-gear type transfer unit (U.S. Pat. No. 4,084,654), results in increased spinning of those wheels with least friction. Therefore, similar "rotation limited devices", such as a cluster of clutches which are actuated externally, are incorporated into the transfer case differential assembly to divert the driving torque back to the driveshaft of the wheels with the greatest traction (U.S. Pat. No. 4,779,699, U.S. Pat. No. 4,860,612, U.S. Pat. No. 5,269,732, CJS5662543). However, using external forces to limit the relative rotation between the components within the planetary gear apparatus, thereby biasing driving torque between the front and rear driveshafts, leads to undesirable drawbacks, such as heat, wear and partial loss of traction force, as is the case with the 'limiting' inter-wheel planetary gear apparatus.

Furthermore, to acquire the maximal traction force between opposite wheels or between front and rear driveshafts in a four-wheel-drive vehicle, some locking devices are implemented, including clutch or cam devices. These devices are generally actuated by a hydraulic, air or mechanical means that is attached to the inter-wheel planetary gear apparatus housing or the inter-axle transfer case. When the locking device is actuated, the front and rear driveshafts or the opposite half axles will be locked together and operate as one rotating unit. Therefore, the driving torque will be equally distributed to driveshafts and wheels for any road condition. Although such kind of locking devices can provide driveshafts or wheels with permanent and equal fraction, loss of the capacity to differentiate the rotational speed between opposite wheels or between front and rear driveshafts prohibits the vehicle from making tight turns or fast driving. If turning of fast driving was attempted, axles breakage or loss of wheel traction could lead to disastrous results.

Understandably, based on the design and limitations of the above mentioned 'limiting' or 'locking' devices equipped within the inter-wheel or inter-axle differential apparatus, the achievement of both equal full-time traction and differentiation of rotational speed and driving torque to all wheels or driveshafts has yet to be solved in a four-wheel-drive vehicle.

SUMMARY OF THE INVENTION

The invention, as currently envisaged, is a planetary gear apparatus that includes:

a pair of internal ring gears interconnected to be driven together;

a pair of planetary gear assemblies each associated with a respective internal ring gear, and each comprising plural sets of planet gears;

each set of planet gears having an outer planet gear in mesh with the respective internal ring gear and an inner planet gear in mesh with its inner planet gear; and a pair of sun gears each associated with a respective planetary gear assembly, each sun gear meshing with the inner planet gears of its associated planetary gear assemblies, and the sun gears being interconnected with each other such that when drive is applied to the internal ring gears and equal load is applied to the sun gears, the inner and outer gear of each pair of planetary gears do not rotate about their own axes, but the entire planetary gear assemblies rotate synchronously with their respective sun gears to deliver full and unbiased traction to both outputs. However, when the load applied to a sun gear causes it to rotate faster than its associated ring gear, the interconnection between the sun gears causes the other sun gear to change its speed oppositely. At the same time, the sets of planet gears associated with the faster rotating sun gear rotate reversely with respect to the internal ring gear, and the sets of planet gears associated with the slower rotating sun gear rotate forward with respect to the internal ring gear to accommodate the speed differential between the sun gears while both internal ring gears are driven at the same speed.

The planetary gear apparatus may be housed within the same planetary gear apparatus casing where the dual internal ring gears are symmetrically built inside the wall surface, and at opposite ends, of the planetary gear apparatus case.

Each planetary gear assembly comprises a plurality of sets of planet gears and a pair of planet-gear carriers. The planet gears may be arranged in pairs with a single outer planet gear and a single inner planet gear, or there may be more gears in each set, for instance, two outer and one inner gears, or two inner and one outer gears. The planet gears may be arranged on respective outer and inner pitch-circle diameters. The outer planet gears are in mesh with the inner planet gears with relative rotation. Planet-gear carriers hold the planet gears in place, relative to one another.

The sun gears may comprise a bevel gear on an inner hub region and a peripheral gear on an outer hub region as well as internal splining on the hub for connection to an output member. The output member associated with each hub may be a half axle which, when rotated synchronously, would deliver full and unbiased traction to the wheels during straight driving.

The interconnection between the two sun gears may comprise a plurality of central pinion gears being rotatably supported by pinion shafts and mounted on a retainer. The action of the central pinion gears being to transfer motion from one sun gear to the other.

The plurality of pinion shafts may be secured to holes in the wall of the planetary gear apparatus casing so that the planetary gear apparatus casing and the interconnection rotate as one. This would keep the indigenous capability of differential rotational speed between opposite wheels, or opposite driveshafts, in response to road conditions.

The planetary gear apparatus may be used either as an inter-axle differential or a differential transfer unit to distribute driving torque to two or more output shafts and two or more wheels. When the planetary gear apparatus case housing the planetary gear apparatus is rotated, the driving torque is distributed via the internal ring gears, planetary gear assemblies and central pinion shaft/gears to the respective sun gears. As a whole, the interactive mesh between internal ring gear, planet gears and sun gear is rotated as an integrated unit at each end of the planetary gear apparatus case. This means that once the planetary gear apparatus case is rotating, the half axles that are internally splined with the sun gears also synchronously rotate, delivering full and unbiased traction to the wheels during straight driving. However, when the vehicle is turning, the outer wheel is subject to a wider circular arc than the inner wheel, and the ground reaction force will cause outside sun gear to rotate faster than the planetary gear apparatus case, causing the outer planetary gear assembly to rotate reversely with respect to the internal ring gear. Simultaneously the central pinion gears bias the bevel gear of the inner sun gear reducing the speed of the inside wheel while the peripheral gear built on sun gear rotates the inner planetary gear assembly forward with respect to the internal ring gear synchronously. Therefore, the acquirement of equal traction and differentiation of rotation speed at wheels in a driven vehicle is achieved by this aspect of the invention.

In a second aspect the invention involves implementing the planetary gear apparatus into the transfer case of a four-wheel-drive vehicle in order to distribute driving torque from the drive train to the front and rear driveshafts respectively. In this instance, a ring gear carrier which supports an external ring gear is mounted on one side of the planetary gear apparatus case to receive driving torque from an input shaft and to rotate the other associated driven shafts in the transfer case. In order to adapt to the alignment of different positions of the front and rear inter-wheel differential housings of a four-wheel-drive vehicle, two alternative types of the planetary gear apparatus case are described with relative positions of the input shaft/gear and front and rear output shafts in the transfer case. One variant has the orientation of the rotational axis of the planetary gear apparatus case arranged in parallel with input shaft/gear. The other has the orientation of the rotational axis of the planetary gear apparatus case arranged perpendicularly to the input shaft/gear which is bevelled to the external ring gear of the planetary gear apparatus case, while the front and rear output shaft/gears bevel perpendicularly to the planetary gear apparatus case through two short intermediate shaft/gears respectively.

The external ring gears, input and output shaft/gears are arranged to distribute incoming driving torque into or out of the planetary gear apparatus in the transfer case, with the mechanism of distribution of driving torque and differentiation of rotational speed identical to that of inter-wheel planetary gear apparatus. Therefore a four-wheel-drive vehicle equipped with the planetary gear apparatus of the invention in both the inter-wheel housing and inter-axle transfer case, will allow the front and rear driveshafts to deliver equal full-time traction and differentiation of speed to all wheels during straight driving or cornering.

More importantly, for a racing car or a fast driven vehicle it is possible for the front inside wheel to lock up due to increased ground reaction force as a result of a sudden change of driving direction. Locking of the front inside wheel, in addition to the inertia of the vehicle, can cause the vehicle to spin off the track. This dangerous and undesirable drawback could possibly happen to a vehicle equipped with the conventional differential of either the open or limited type.

Using the planetary gear apparatus of the invention in the planetary gear apparatus case and transfer case, results in all wheels of the vehicle being equally powered, while still allowing differentiation of rotational speed in response to cornering. Therefore, the potential of locking up the front inside wheel is reduced which decreases the likelihood of the vehicle spinning. Furthermore, on a rugged road, even one wheel or one driveshaft of a driven vehicle is suspended above the ground, all the driving torque will be distributed via the integral form of internal ring gears, to power the wheel(s) which are still in contact with the ground, until the suspended wheel(s) regain the traction with the ground.

While current locking differentials used in a four-wheel-drive vehicle are prone to mechanical bind-up of gears, tyre wear, and possible half axle or driveshaft breakage if the vehicles speed is excessive during cornering or racing, this non-locked, but fully meshed planetary gear apparatus of this invention is free of these limitations.

As is readily apparent, the compatibility of the planetary gear apparatus of the invention used in both the inter-wheel differential housing and inter-axle transfer case allows for less expensive manufacture. Additionally, the planetary gear apparatus is a simple mechanic design geared to distribute equal but full-time traction, and allowing differential rotation speed, to all wheels, while not requiring any limiting or locking components within the differentials.

DETAILED DESCRIPTION OF THE PREFERRED EMBODIMENTS

Referring to the complete cross-sectional (FIG. 1) and exploded view (FIG. 2) of the planetary gear apparatus case 21, it is shown that the planetary gear apparatus of the invention includes the planetary gear apparatus case 21, which is rotatably supported in the inter-wheel differential housing 17a, 17b, 20a, 20b and inter-axle transfer case 5a, 5b (FIGS. 10 and 11) of vehicle. There is a ring gear carrier 22 with multiple radial equi-distant holes 23 located on the left-hand side of planetary gear apparatus case 21. Two (left and right-hand) internal ring gears 24a, 24b are symmetrically built inside the wall surface at the opposite ends of planetary gear apparatus case 21 to internally mesh with two (left and right-hand) planetary differential assemblies 25a, 25b respectively in a concentric relation. Two (left and right-hand; sun gears 26a, 26b are coaxially arranged at opposite ends of the planetary gear apparatus case 21. A peripheral gear 27a, 27b is formed integral with hub of a sun gear 26a, 26b to externally mesh with the planetary differential assembly 25a, 25b respectively in a concentric relation.

Figure 1:
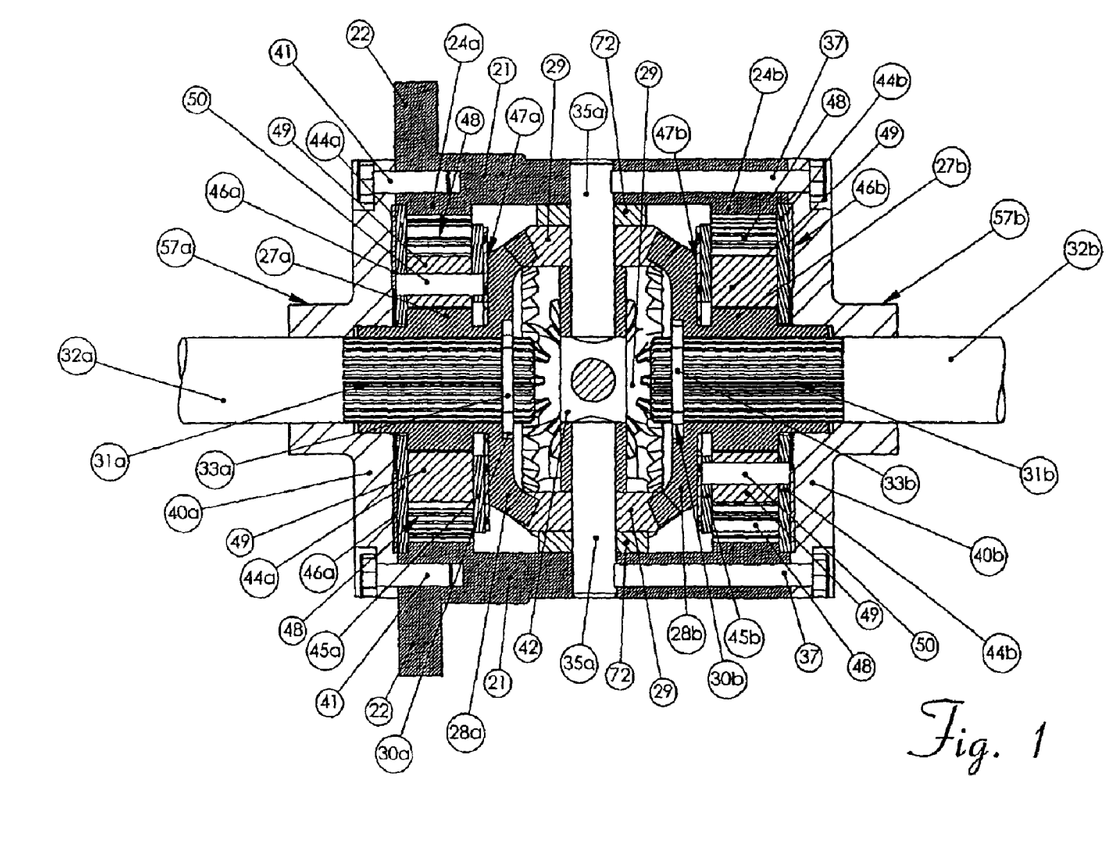
FIG. 1 is a longitudinal cross-section view of the planetary gear apparatus showing the structural arrangement of the components in the planetary gear apparatus case in accordance with the embodiment of the invention.
Figure 2:
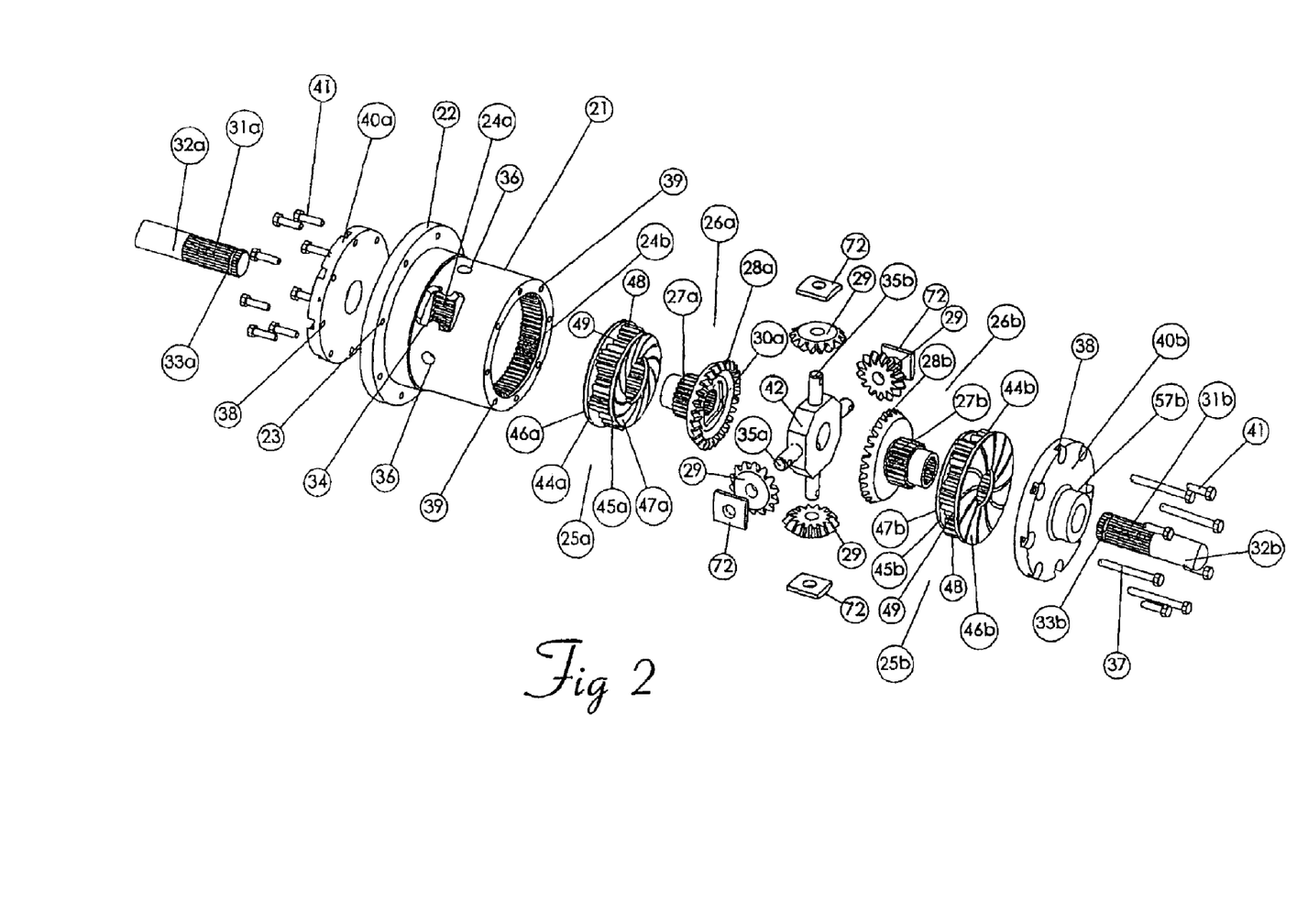
FIG. 2 is a complete longitudinal exploded view of the planetary gear apparatus showing the details of the arrangement of the components in the planetary gear apparatus case in accordance with the embodiment of the invention.

Further, a bevel gear 28a, 28b is formed integral with the hub of the sun gear 26a, 26b to engage a plurality of central pinion gears 29. A recess 30a, 30b inside the inner surface of the bevel gear 28a, 28b of the sun gears. 26a, 26b is designed to accommodate a C-clip, which is used to secure the inboard end 31a, 31b of the half axle 32a, 32b in the end peripheral groove 33a, 33b. The C-clip is inserted into the planetary gear apparatus case 21 through a large access window 34. The central pinion shafts 35a, 35b are supported at one end in holes 36 in, the wall of the planetary gear apparatus case 21 via long bolts 37 and at the other end by a retainer 42. The pinion gears 29 are rotatably supported by the pinion shafts 35a, 35b and constrained by the retainer 42 and a pinion thrust washer 72 which is located against the inside wall of the planetary gear apparatus case 21. There are holes 38 arranged radially on the peripheral edge of differential cover 40a, 40b which are concentric with treaded holes 39 in the wall of planetary gear apparatus case 21 to accommodate long 37 and short bolts 41 respectively. Both long 37 and short bolts 41 are used to secure differential covers 40a, 40b to the opposite ends of the wall of the planetary gear apparatus case 21. The short 35a and long 35b pinion shafts are centrally located by a retainer 42 in the middle of the intersection of the rotational center of the planetary gear apparatus case 21. The inboard end 31a of the left-hand half axle 32a is internally splined with hub of the left-hand sun gear 26a, while the inboard end 31b of right-hand half axle 32b is internally splined with the hub of right-hand sun gear 26b.

Figure 3:
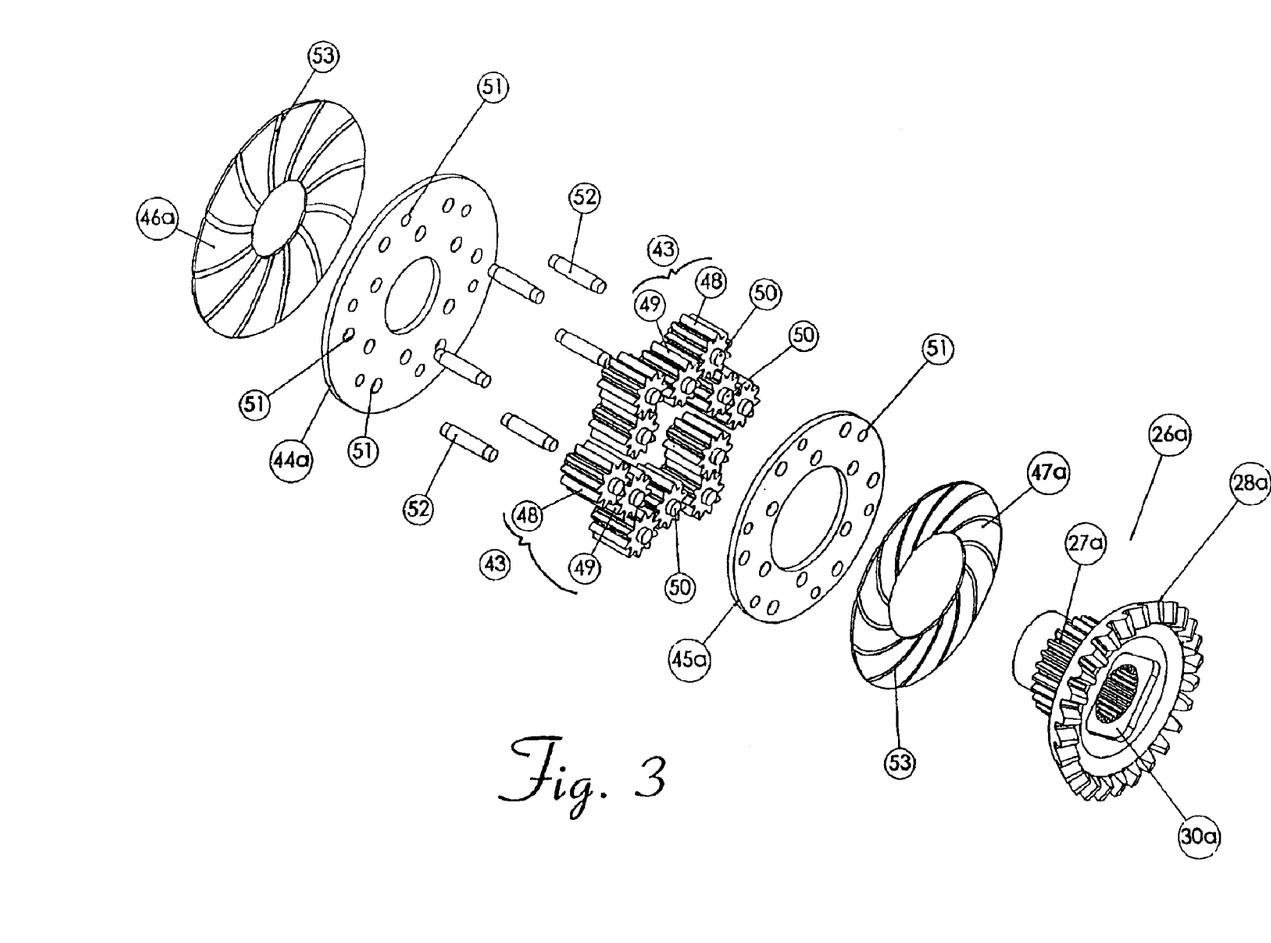
FIG. 3 is an exploded view of the structural arrangement of left-hand planetary gear assembly relative to sun gear of the planetary gear apparatus of the invention.
Figure 4:
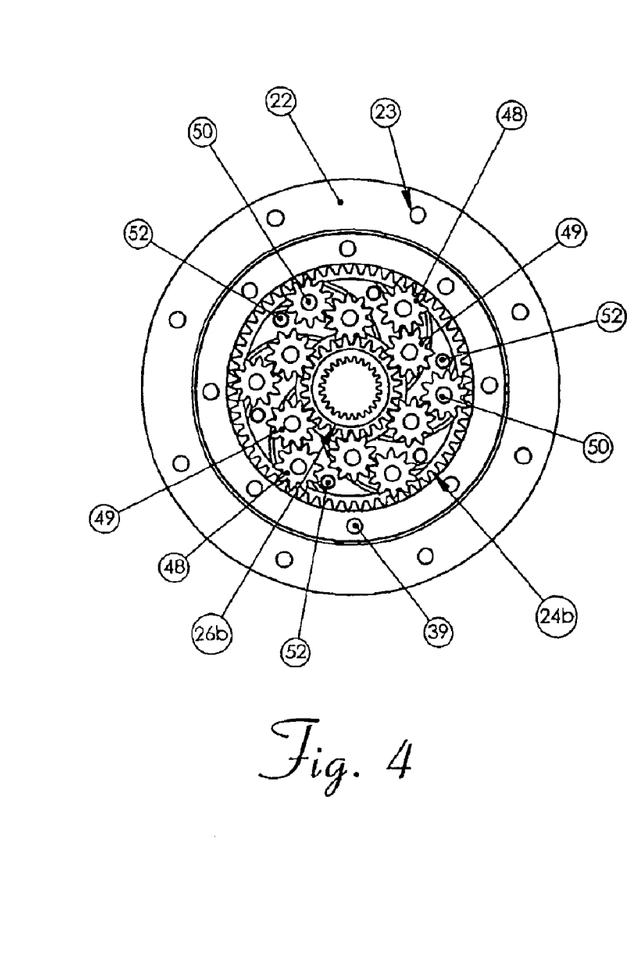
FIG. 4 is the open-end view of the planetary gear apparatus case showing the structural arrangement of the right-hand planetary assembly relative to the internal ring gear and sun gear in the planetary gear apparatus of the invention.
Figure 5:
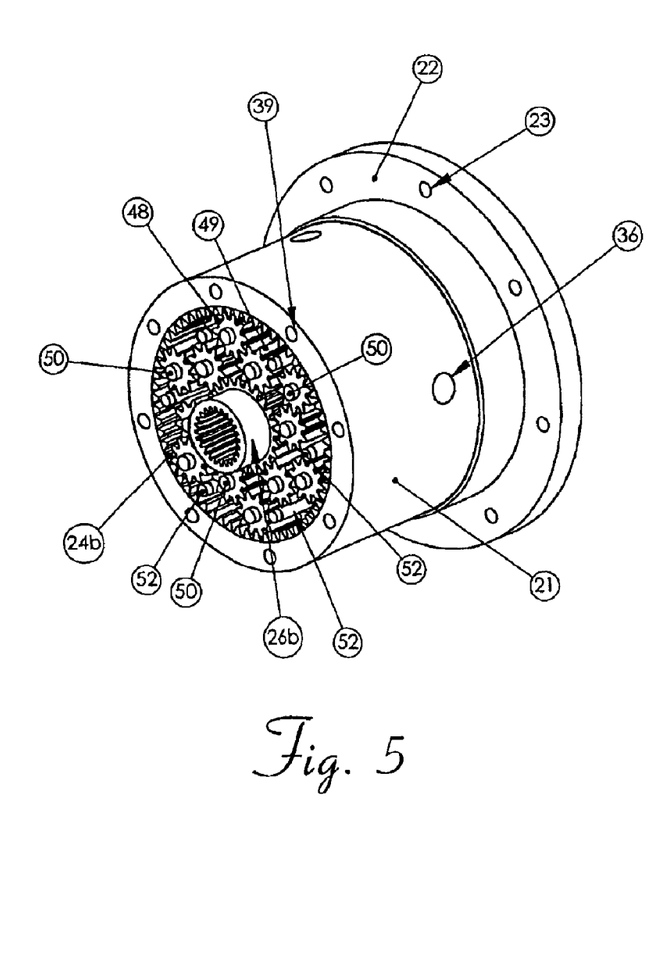
FIG. 5 is the open oblique view of the planetary gear apparatus case showing the structural arrangement of the right-hand planetary assembly relative to internal ring gear and sun gear in the planetary gear apparatus of the invention.

As shown in FIGS. 1, 2 and 3, the left-hand planetary differential assembly 25a comprises a plurality of sets of planet-gear pairs 43 (6 sets of planet-gear pairs in this example), outside 44a and inside planet-gear carriers 45a, and outside 46a and inside grooved washers 47a. The right-hand planetary differential assembly 25b is a mirror image of the left-hand planetary differential assembly 25a. The embodiment of each planetary differential assembly 25a, 25b is aligned with an internal ring gear 24a, 24b and a peripheral gear 27a 27b of a sun gear 26a, 26b at the opposite ends of the planetary gear apparatus case 21 in a concentric relation respectively. For the integral illustration, the arrangement of above-mentioned components is comprehensively shown in right-hand open end (FIG. 6) and open oblique end (FIG. 7) views of the planetary gear apparatus case 21. Each planet-gear pair set 43 is composed of an outer 48 and inner 49 planet gear, that are radially and equally arranged on an inner and outer pitch circle diameter. The outer 48 and inner 49 planet gear of each planetary gear set 43 are meshed together and rotate relatively with each other while subjected to force either from the internal ring gear 24a, 24b or the sun gear 26a, 26b.

Referring to FIGS. 1 and 3, the outer planet gears 48 are externally in mesh with the internal ring gear 24a, 24b of the planetary gear apparatus case 21, while the inner planet gears 49 are internally in mesh with the peripheral gear 27a, 27b on the hub of the sun gear 26a, 26b. Each planet gear 48, 49 has a central rotational pin 50. There rotational pins 50 are equidistantly and concentrically located within holes 51 of the inner 44a, 45a and outer 44b, 45b planet-gear carriers. All pairs of planet gears 48, 49 are secured by the outside 44a, 44b and inside 45a, 45b planet-gear carriers which are held together with a plurality of bolts 52.

To insure that all constructional components fit properly inside the planetary gear apparatus case 21, the planetary gear apparatus case cover 40a, 40b is bolted to the planetary gear apparatus case 21 via the threaded holes 39 which in-turn secures the planetary differential assemblies 25a, 25b at opposite ends of the planetary gear apparatus case 21. The inside peripheral edge of the larger outside planet-gear carrier 44a, 44b is in contact with the outside peripheral edge of the internal ring gear 24a, 24b while the outer 46a and inner ring washers 47a are positioned to interface between the planetary gear apparatus case cover 40a, 40b and the outside planet gear carrier 44a, 44b, and between the inside planet-gear carrier 45a, 45b and the bevel gear 28a, 28b respectively, at the opposite ends of planetary gear apparatus case 21 (see FIGS. 1, 2, and 3). The helical grooves 53 on the surface of washer 46a, 47a are used to distribute lubricant between the contacting surfaces of each component.

In operation, when a vehicle is in travelling, driving torque is distributed to the front 17a, 17b and rear 20a, 20b differential housings via the front 16a, 16b and rear 19a. 19b input shafts. The two internal ring gears 24a, 24b, and central pinion shafts 35a, 35b fixed to the wall of the planetary gear apparatus case 21 are the main torque distributors which rotate the dual planetary gear assemblies 25a, 25b, sun gears 26a, 26b, and half axles 32a, 32b. The internal ring gears 24a, 24b, central pinion gears 29 and shafts 35a, 35b, outer 48 and inner 49 planet gears, planet-gear carriers 44a, 45a, 44b, 45b, and sun gears 26a, 26b of the planetary gear apparatus case 21 are always driven as an integral unit to distribute equal torque to rotate the opposite half axles. Any driving torque bias between the two opposite sun gears 26a, 26b will be cancelled off by the equal rotational speed between the opposite planetary gear assemblies 25a, 25b which are synchronously driven by internal ring gears 24a, 24b. Therefore in a straight driving situation, there is no tractional loss, nor difference of the driving torque, between the opposite half axles 32a, 32b in planetary gear apparatus case 21. However, in a situation where one wheel of a vehicle has less, or no traction (i.e. suspended off the ground), with the ground all the driving torque will be transferred to the opposite grounded wheel until the slipping wheel regains full traction at which stage the torque will be equally distribute to each wheel again. This unique feature of the planetary gear differential apparatus of the invention prevents substantial loss of traction, which is associated with a conventional open differential, when one wheel has less, or no, traction with the ground compared to the opposite wheel.

When a vehicle is in cornering situation, it is also apparent that such a kind of planetary gear apparatus is able to differentiate rotation speed between the opposite wheels similar to the conventional open differential. For example, during a right turn the outside wheel of the vehicle needs to travel faster around a larger arc than the inside wheel that travels along a lesser arc. In accordance with the operation of the planetary gear apparatus of the invention, the actuated peripheral gear 27a on hub of the outside sun gear 26a will rotate faster than the planetary gear apparatus case 21, causing the inner 49 and outer 48 planet gears of outside planetary differential assembly 25a to rotate, that in-turn causes the outer planetary gear assembly 25a to travel around the internal ring gear 24a in a reverse direction with respect to the planetary gear apparatus case 21. Synchronously, the bevel gear 28a on the hub of outside sun gear 26a will rotate the beveled central pinion gears 29 thereby reducing the rotational speed of inside bevel gear 28b of the inside sun gear 26b with respect to the planetary gear apparatus case 21. This causes the inside planetary differential assembly 25b to be independently rotated in a forward direction around the inside internal ring gear 24b in accordance with the interactive meshing between outer planet gears 48 and inner planet gears 49 and the inside sun gear 26b and internal ring gear 24b.

Because all the differential components included in the planetary differential apparatus of the invention are constantly engaged with each other, there is minimal heat, wear and tear produced among these components when compared to the conventional 'limited' slip differential. More importantly, there is no need for the vehicle to 'lock' the differential to acquire maximal equal traction at wheels which reduces the maximal driving speed.

Additionally, the planetary differential apparatus of the present invention can also be applied to the transfer case in a four-wheel-drive vehicle to distribute driving torque from transmission to the front and rear drive lines. This planetary differential apparatus of the invention provides the vehicle with equal and full-time torque distribution and differentiation of rotational speed between front and rear driveshafts regardless to road conditions and during cornering.

Figure 6:
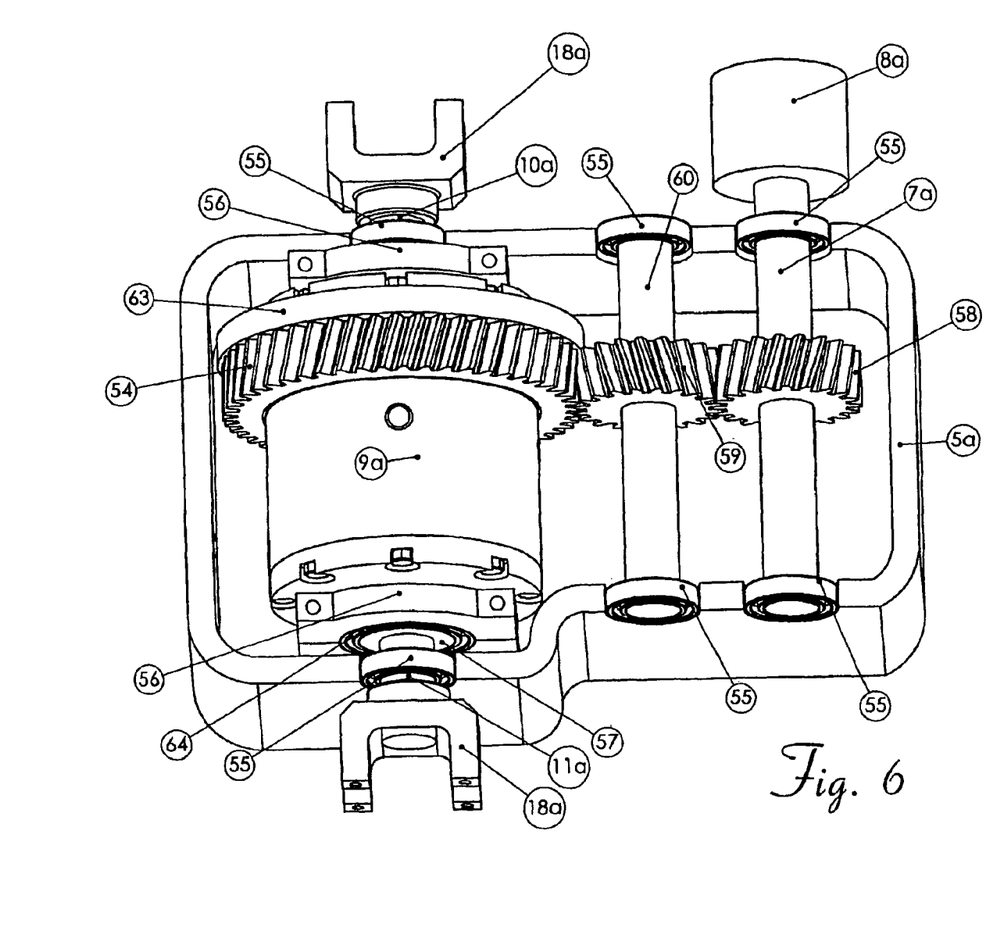
FIG. 6 is the top oblique view of the differential transfer unit with arrangement of the rotational axis of the planetary gear apparatus case of the invention in parallel with the intermediate shaft/gear and input shaft/gear.
Figure 7:
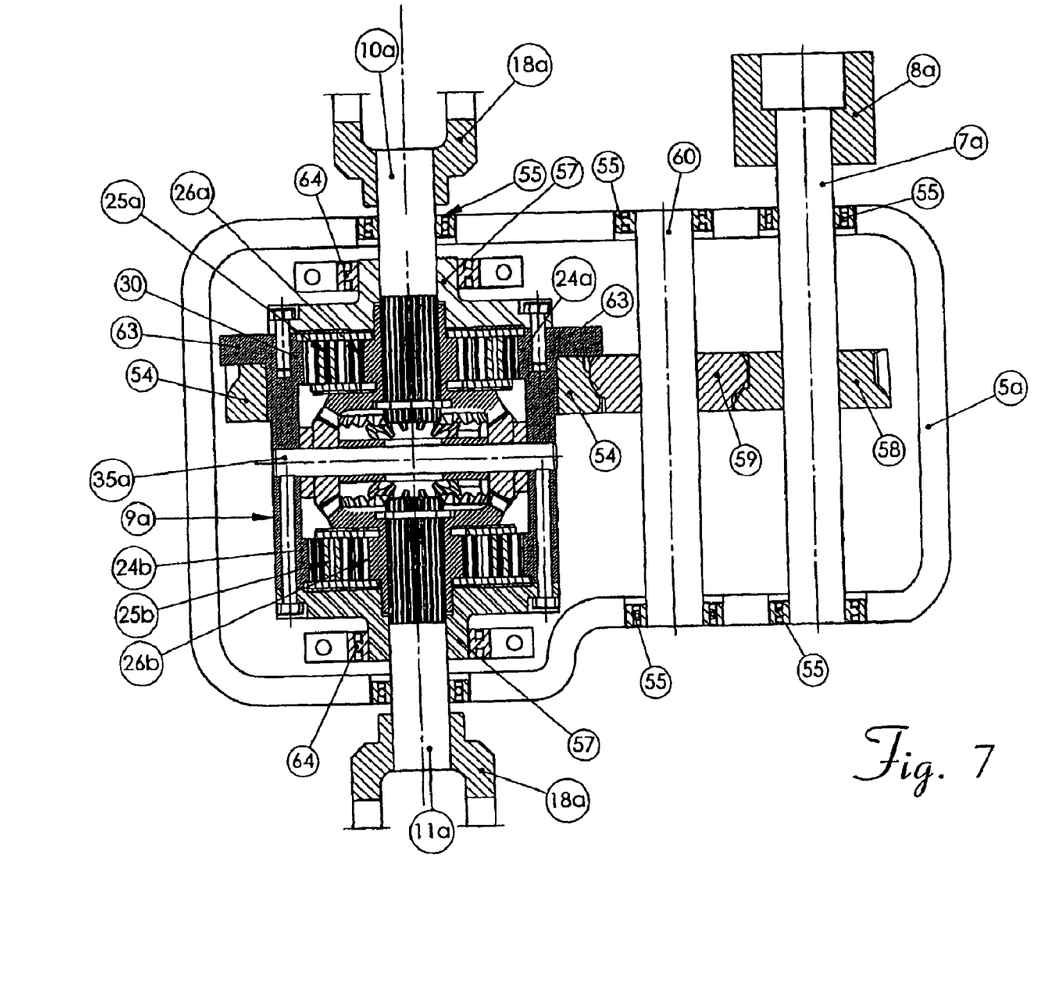
FIG. 7 is the cross sectional view of FIG. 6 of the differential transfer unit with the exposure of structural components of the planetary gear apparatus in the planetary gear apparatus case.
Figure 10:
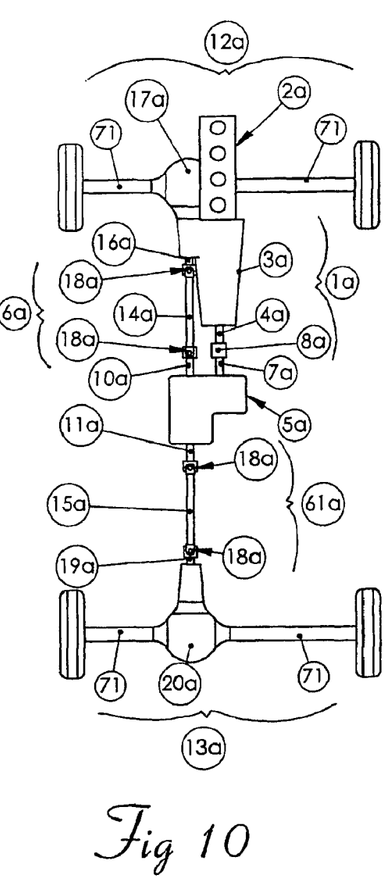
FIG. 10 is a top plan view of a four-wheel-drive system including the layout of the drive train, differential transfer unit, front and rear drive lines, and front and rear axle assemblies.

To achieve the same function as the inter-wheel planetary differential apparatus, the orientation of the planetary gear apparatus case, relative to the coupled input and output shafts in the transfer case, needs be specifically arranged. As shown in FIGS. 6, 7 and 10, the orientation of rotational axis of planetary gear apparatus case 9a in the transfer case 5a is positioned in a straight-line connection with the front 10a and rear 11a output shafts. The opposite cylindrical bearing surfaces 57 of the planetary gear apparatus case 9a are rotatably supported by roller bearings 64 and cap clamps 56 in transfer case 5a. To implement rotation of the planetary gear apparatus case 9a, an external ring gear 54 is mounted to a ring gear carrier 63 of the planetary gear apparatus case 9a. The front output shaft 10a of the transfer case 5a, coupled to the front driveshaft 14a via a U joint/yoke 18a, is internally splined with the front-end sun gear 26a, while rear output shaft 11a, coupled to rear driveshaft 15a via a U joint/yoke 18a, is internally splined with the rear-end sun gear 26b. In operation, driving torque from the engine 2a is transmitted via the output shaft 4a of transmission 3a to an input shaft/gear 7a, 58 of the transfer case 5a via a ring coupler 8a. A bevel gear 58 of the input shaft 7a is meshed with a bevel gear 59 of an intermediate shaft 60, while the external ring gear 54 of the planetary gear apparatus case 9a is meshed with a bevel gear 59 of an intermediate shaft 60. The rotational axes of the input 7a, intermediate 60, and front 10a and rear 11a output shafts are in parallel orientation and on a common plane relative to the planetary gear apparatus case 9a. Each shaft 7a, 60, 10a, 11a is rotatably supported by roller bearings 55 within the wall of the transfer case 5a.

As shown in FIGS. 6 and 7, the pathway of driving torque from transmission 3a is directly transferred to the input shaft/gear 7a, 58 to drive the intermediate shaft/gear 60, 59 in the transfer case 5a. In turn, the powered intermediate shaft/gear 60, 59 rotates the planetary gear apparatus case 9a via the external ring gear 54. Inside the planetary gear apparatus case 9a, the driving torque is distributed to the internal ring gears 24a, 24b, central pinion shafts 35a, 35b, planetary differential assemblies 25a, 25b, and sun gears 26a, 26b to integrally rotate the front 10a, and rear 11a output shafts in transfer case 5a. Consequently, the driving torque is distributed to power the front 6a and rear 61a drive lines, and front 12a and rear 13a axle assemblies with equal traction.

Figure 8:
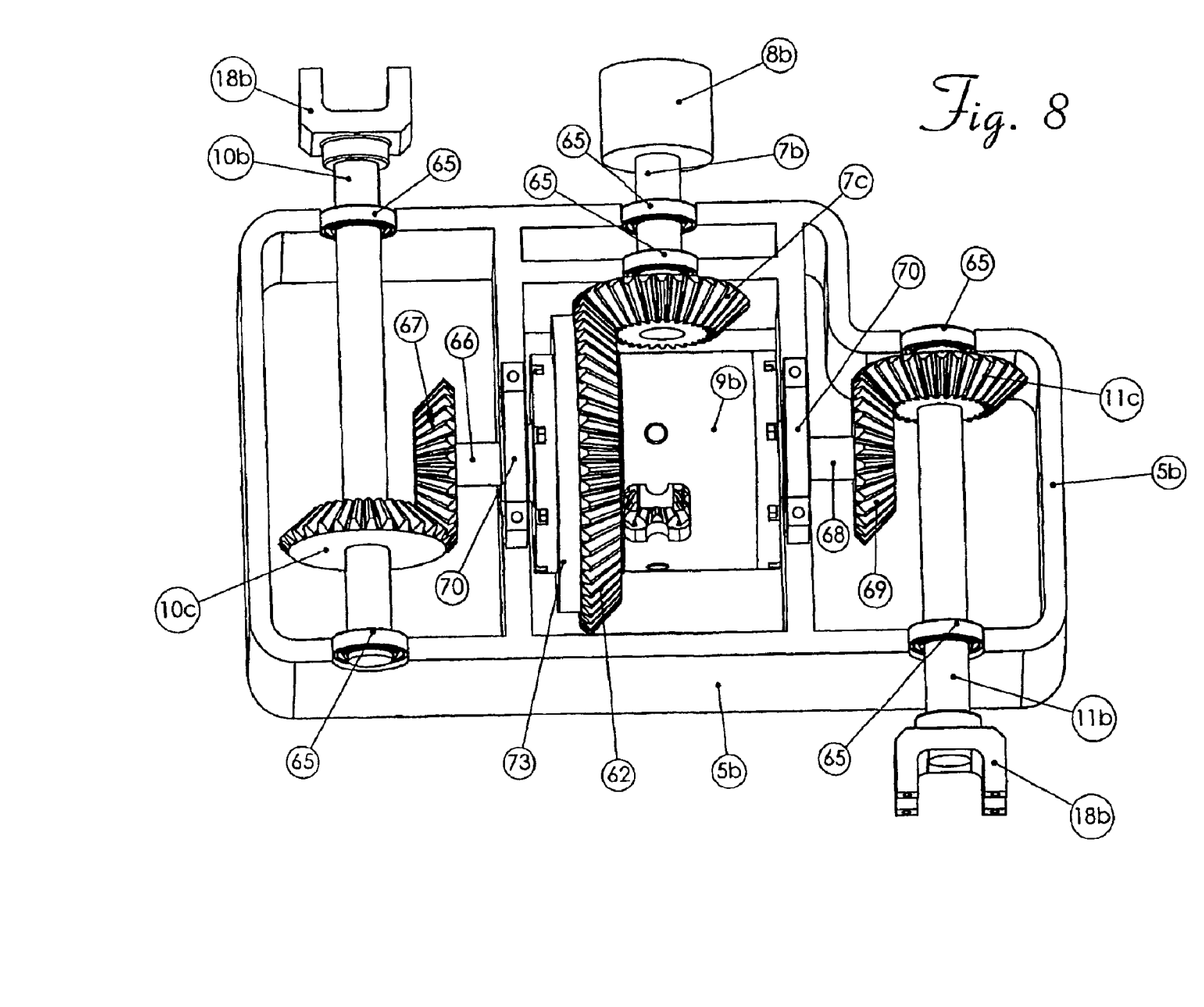
FIG. 8 is the top oblique view of the differential transfer unit with arrangement of the rotational axis of the planetary gear apparatus case of the invention oriented at right angle to the central input shaft, and the left and right-hand output shafts/gears.
Figure 9:
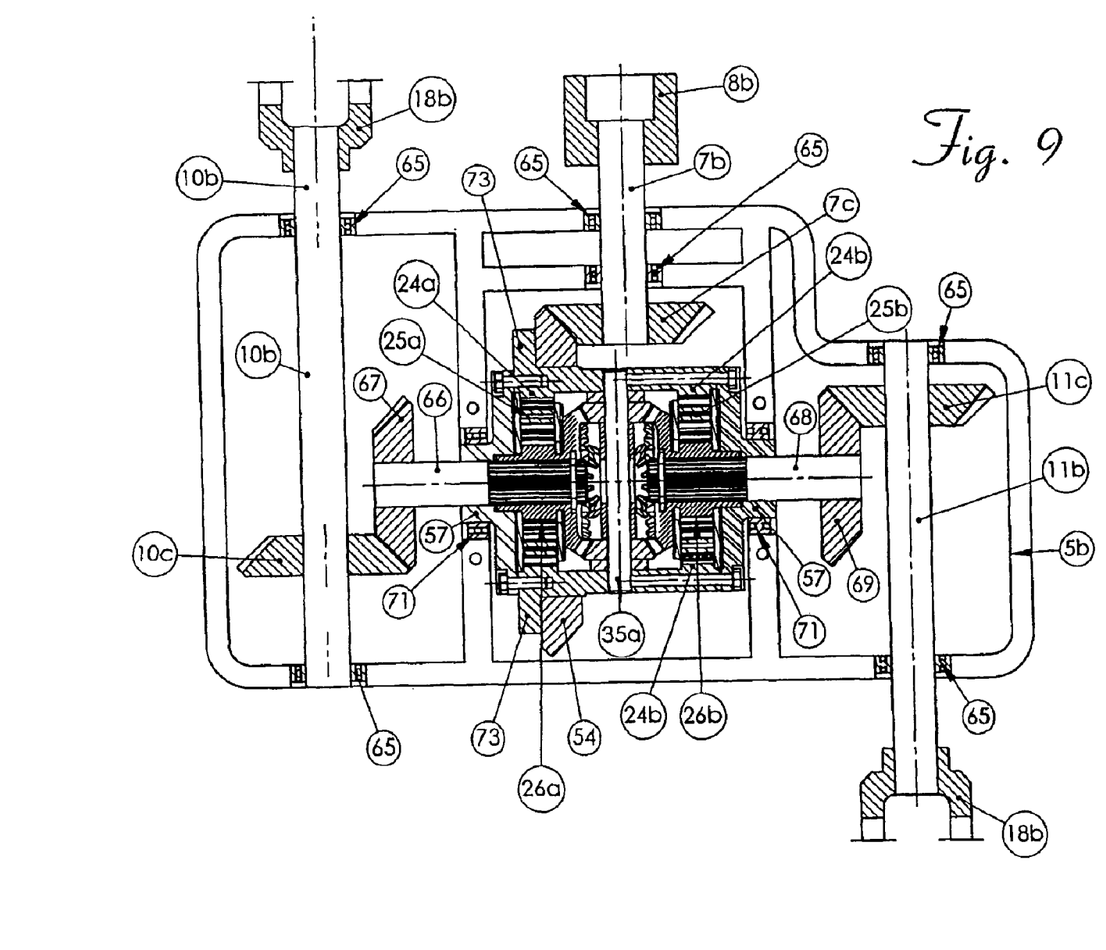
FIG. 9 is the cross sectional view of FIG. 8 of the differential transfer unit with the exposure of the structural components of the planetary gear apparatus in the planetary gear apparatus case.
Figure 11:
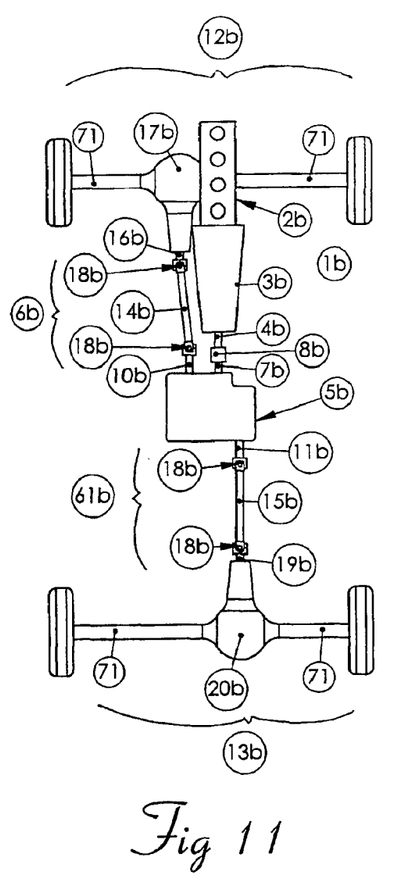
FIG. 11 is a top plan view of a four-wheel-drive system including the alternative layout of the drive train, differential transfer unit, front and rear drive lines, and front and rear axle assemblies.

As shown in FIGS. 8, 9 and 11, there is another arrangement of the planetary gear apparatus case 9b in the transfer case 5b. In this case the rotational axis of the planetary gear apparatus case 9b is oriented at right angle to the axes of the input shaft/gear 7b, 7c, and the front 10b 10c and rear 11b, 11c output shaft/gears. An external ring gear 62 mounted to a ring gear carrier 73 of the planetary gear apparatus case 9b is perpendicularly in mesh with a bevel gear 7c of an input shaft 7b, which is coupled to an output shaft 4b of the transmission 3b via a ring coupler 8b. The opposite cylindrical bearing surfaces 57 of the planetary gear apparatus case 9b are rotatably supported by roller bearings 71 and cap clamps 70 in the transfer case 5b. Two short intermediate output shaft/gears 66, 68, 67, 69 are internally splined with the sun gears 26a, 26b at the opposite ends of the planetary gear apparatus case 9b respectively. The left-hand front output shaft/gear 10b, 10c is offset and aligned in parallel with the right-hand rear output shaft/gear 11b, 11c, each of which are beveled with their respective short intermediate shaft/gears 66, 68, 67, 69 at right angles. Outside the transfer case 5b the left-handed front output shaft 10b is coupled to front driveshaft 14b via a U joint/yoke 18b, while the right-handed rear output shaft 11b is coupled to the rear driveshaft 15b via a U joint/yoke 18b. All the axes of the input 7b, 7c, front 14b, 10c and rear 11b, 11c output shaft/gears, and short intermediate shaft/gears 66, 68, 67, 69 are located on a common plane relative to planetary gear apparatus case 9b and rotatably supported by roller bearings 65 located within the wall of the transfer case 5b.

In operation, the embodiment of planetary differential apparatus of the invention in transfer case 5b as shown in FIGS. 8, 9 and 11, the driving torque from transmission 3b is output to the input shaft/gear 7b, 7c of the transfer case 5b via a ring coupler 8b. The bevel gear 7c of the input shaft 7b rotates the planetary gear apparatus case 9b via the external ring gear 62. Inside the planetary gear apparatus case 9b, driving torque is distributed to the internal ring gears 24a, 24b, central pinion shafts 35a, 35b, planetary differential assemblies 25a, 25b, and sun gears 26a, 26b to rotate the opposite shorn intermediate output shaft/gears 66, 68, 67, 69 which in-turn power the respective front lob 10c and rear 11b, 11c output shaft/gears in the transfer case 5b. Consequently, the driving torque is distributed to power the front 6b and rear 61b drive lines, and front 12b and rear 13b axle assemblies with equal traction.

Referring to FIGS. 10 and 11, two different four-wheel-drive systems are exhibited of vehicles equipped with the planetary gear apparatus of the invention in the front and rear differential housings, and in the transfer case.

As shown in FIGS. 10 and 11, the drive trains 1a, 1b, in each vehicle incorporates an engine 2a, 2b, a transmission 3a, 3b coupled to the engine 2a, 2b and an output shaft 4a, 4b driven via a transmission 3a, 3b respectively. Driving torque from the drive trains 1a, 1b is further distributed by a transfer case 5a, 5b into a, front drive line 6a and a rear drive line 6b via an input shaft 7a, 7b coupled by a ring couple 8a, 8b to an output shaft 4a, 4b of the transmission 3a, 3b respectively. The front drive line 6a includes a front output shaft 10a, 10b of the transfer case 5a, 5b, front driveshaft 14a, 146, input shaft 16a, 16b of a front differential housing 17a, 17b and coupled U joint/yokes 18a, 18b. The rear drive line 6b includes a rear output shaft 11a, 11b of the transfer case 5a, 5b, rear driveshaft 15a, 15b, input shaft 19a, 19b of a rear differential housing 20a, 20b and coupled U joint/yokes 18a, 18b.

There are two different constructs of the transfer case 5a, 5b as shown in FIGS. 10 and 11 respectively. Each of them is arranged in accordance with the orientation of rotational axis of the planetary gear apparatus case 9a, 9b relative to the output 11a, 11b and the input 7a, 7b shafts of the transfer case 5a, 5b. The details about the construction of transfer case were described in accordance with FIGS. 6, 7, 8 and 9.

As illustrated in FIG. 10, the front output shaft 10a of the transfer case 5a is aligned with the rear output shaft 11a of the transfer case 5a in a concentric relation while the input shaft 7a of the transfer case 5a is coupled to the output shaft 4a of the transmission 3a on the opposite side.

As illustrated in FIG. 11, the front output shaft 10b of the transfer case 5b is laterally offset, and in parallel with, the rear output shaft 11b of the transfer case 5b. The input shaft 7b of the transfer case 5b is centrally coupled to the output shaft 4b of the transmission 3b.

The front axle assembly 12a, 12b includes the front differential housing 12a, 12b with the planetary gear apparatus case 21 and the axle housing 71 with opposite half axles 32a, 32b. The rear axle assembly 13a, 13b includes the rear differential housing 20a, 20b with the planetary gear apparatus case 21 and the axle housing 71 with opposite half axles 32a, 32b.

To deliver driving torque, via the transfer case 5a, 5b, to the front, axle assembly 12a, 12b and the rear axle assembly 13a, 13b respectively, the front 10a, 10b and rear 11a, 11b output shafts of the transfer case 5a, 5b need to be arranged as follows. The front output shaft 10a, 10b of the transfer case 5a, 5b is connected to the front driveshaft 14a, 14b via a U joint/yoke 18a, 18b to power the front axle assembly 12a via the front input shaft 16a, 16b of the inter-wheel differential housing 17a, 17b. The rear output shaft 11a, 11b of the transfer case 5a, 5b is connected to the rear driveshaft 15a, 15b via a U joint/yoke 18a, 18b to power the rear axle assembly 20a, 20b via the rear input shaft 19a, 19b of the inter-wheel differential housing 20a, 20b.

A vehicle equipped with the same planetary differential apparatus of the invention in both inter-wheel differential housing and inter-axle transfer cases, will enable power to be delivered through the transfer case and front and rear differential cases to all wheels thereby achieving full-time traction. Even with the worst road condition, when any one wheel or axle is suspended or lost traction, all the driving torque will be distributed to the wheel(s) or axle(s) that have the greatest friction with the ground until the suspended or slipping wheel(s) or axle(s) regain full traction with the ground again. During cornering, the different rotational speeds between opposite wheels, between the front and rear wheels, and between front and rear axles can be differentiated by the planetary gear apparatus case described in this invention in both the front and rear differential housing and the transfer case thereby allowing the vehicle to make a smooth turn, just as the conventional open differential allows in four-wheel-drive vehicle.

Furthermore, when a vehicle is executing a fast corner, the front inside wheel has the potential to be slowed down or even locked up due to a sudden increase in ground resistance force on the front inside wheel, as a result of progressive alteration of direction of the vehicle. This could cause the vehicle to lose traction and spin off the road or track under the influence of the inertia of the vehicle. However, the resultant drawbacks of slowing down or locking up the front inside wheel of the vehicle during cornering is effectively prevented by the planetary gear apparatus of the invention, when incorporated in the differential housing and the transfer case.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A planetary gear apparatus comprising:

a pair of internal ring gears interconnected to be driven together;

a pair of planetary gear assemblies each meshingly engaged respectively with one of said pair of internal ring gears, each comprising a plurality of sets of planet gears;

each of said sets of planet gears having an outer planet gear meshingly engaged respectively with one of said pair of internal ring gears and an inner planet gear meshingly engaged with another inner planet gear; and, a pair of sun gears each meshingly engaged respectively with one of said planetary gear assemblies, each of said pair of sun gears meshingly engaged respectively with one of said pair of inner planet gears the sun gears being interconnected with each other such that when a driving force is applied to the internal ring gears and an equal force is applied to the sun gears, the inner and outer planet gear of each pair of planetary gears do not rotate about their own axes, but the entire planetary gear assemblies rotate synchronously with their respective sun gears to deliver full and unbiased traction to both outputs, and when the equal force applied to one of said pair of sun gears causes it to rotate faster than its associated respective ring gear, an interconnection between the sun gears causes the other sun gear to change its speed oppositely, and the sets of planet gears associated with the faster rotating sun gear rotate reversely with respect to the internal ring gear, and the sets of planet gears associated with the slower rotating sun gear rotate forward with respect to the internal ring gear to accommodate the speed differential between the sun gears while both internal ring gears are driven at the same speed.

2. Planetary gear apparatus according to claim 1 in which the pair of internal ring gears are symmetrically formed at opposite ends on an inner wall surface of a planetary gear apparatus case.

3. Planetary gear apparatus according to claim 1 in which each planetary gear assembly comprises a plurality of sets of planet gears.

4. Planetary gear apparatus according to claim 3 in which each of said planetary gear assemblies comprises a plurality of outside helical grooved washers and a plurality of inside helical grooved washers.

5. Planetary gear apparatus according to claim 4 in which the helical grooves on a surface of an outside and an inside washers are used to distribute lubricant.

6. Planetary gear apparatus according to claim 3 in which each planet gear set is composed of outer and inner planet gears that are radially arranged on an inner and outer pitch circle diameter.

7. Planetary gear apparatus according to claim 3 in which the inner and outer planet gears are rotatably supported by a pair of planet-gear carriers in a common plane.

8. Planetary gear apparatus according to claim 6 in which each planet gear carrier pair has a central rotational pin.

9. Planetary gear apparatus according to claim 8 in which each central rotational pin is equidistant and concentrically located within one of a plurality of holes of the inner and outer planet gear carriers.

10. Planetary gear apparatus according to claim 9 in which pairs of planet gears are secured by the outside and inside planet gear carriers which are held together with a plurality of bolts.

11. Planetary gear apparatus according to claim 1 in which the sun gears comprise a bevel gear on an inner hub region and a peripheral gear on an outer hub region as well as internal splining on the inner hub region for connection to an output member.

12. Planetary gear apparatus according to claim 1 in which the output member associated with each hub is a half axle which, when rotated synchronously, would deliver full and unbiased traction to a set of vehicle wheels during straight driving.

13. Planetary gear apparatus according to claim 1 in which an interconnection between the two sun gears comprises a plurality of central pinion gears.

14. Planetary gear apparatus according to claim 13 in which the pinions are rotatably supported by pinion shafts and mounted on a retainer, the action of the central pinion gears being to transfer motion from one sun gear to the other.

15. Planetary gear apparatus according to claim 14 in which the plurality of pinion shafts are secured to holes formed in a wall of the planetary gear apparatus case so that the planetary gear apparatus case and interconnections rotate as one.

16. Planetary gear apparatus according to claim 2 in which a planetary gear apparatus case cover is bolted to the planetary gear apparatus case via threaded holes to secure the planetary gear assemblies at opposite ends of the planetary gear apparatus case.

* * * * *